United States Patent
Murthy et al.

(10) Patent No.: US 8,970,596 B2
(45) Date of Patent: Mar. 3, 2015

(54) USING RENDER-GRAPH CHARACTERISTICS TO OPTIMIZE THE RENDERING OF AN ADJUSTED IMAGE

(75) Inventors: Giridhar Sreenivasa Murthy, Sunnyvale, CA (US); David Hayward, Los Altos, CA (US); Alexandre Naaman, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 225 days.

(21) Appl. No.: 13/399,444

(22) Filed: Feb. 17, 2012

(65) Prior Publication Data
US 2013/0215141 A1 Aug. 22, 2013

(51) Int. Cl.
*G06T 11/20* (2006.01)

(52) U.S. Cl.
USPC .......................................... 345/440

(58) Field of Classification Search
CPC .............................. G06T 11/206; G06F 3/0481
USPC .......................................... 345/440
See application file for complete search history.

(56) References Cited

U.S. PATENT DOCUMENTS

| | | | |
|---|---|---|---|
| 6,243,856 B1 * | 6/2001 | Meyer et al. ................... | 717/146 |
| 7,068,272 B1 * | 6/2006 | Voorhies et al. ............... | 345/422 |
| 7,069,272 B2 * | 6/2006 | Snyder .................................. | 1/1 |
| 8,044,963 B2 | 10/2011 | Harper | |
| 2001/0029505 A1 * | 10/2001 | Gaudette et al. ............... | 707/102 |
| 2005/0231514 A1 * | 10/2005 | Harper et al. .................. | 345/501 |
| 2008/0024495 A1 * | 1/2008 | Mech et al. .................... | 345/426 |
| 2008/0278482 A1 * | 11/2008 | Farmanbar et al. ........... | 345/419 |
| 2010/0214301 A1 * | 8/2010 | Li et al. .......................... | 345/522 |
| 2010/0328327 A1 * | 12/2010 | Hervas et al. .................. | 345/522 |
| 2013/0057563 A1 * | 3/2013 | Persson .......................... | 345/522 |

OTHER PUBLICATIONS

C. Rieder, S. Palmer, F. Link, and H. K. Hahn. A Shader Framework for Rapid Prototyping of GPU-Based Volume Rendering. Computer Graphics Forum (Special Issue on Eurographics Symposium on Visualization), 30(3):1031-1040, Jun. 1, 2011.*

* cited by examiner

*Primary Examiner* — Javid A Amini
*Assistant Examiner* — Jin Ge
(74) *Attorney, Agent, or Firm* — Wong, Cabello, Lutsch, Rutherford & Brucculeri, LLP

(57) ABSTRACT

A technique for optimizing the rendering of such complex render-graphs caches intermediate buffers of nodes that are expected to be re-used after they've been rendered. The render-graph is examined to determine the number of re-uses of each node's output buffer, and the buffer is cached in memory until all the re-uses of the buffer have occurred. Once all the re-uses of the buffer have occurred, the buffer is removed from the cache. This technique guarantees that for a given render-graph, no nodes will be re-rendered, resulting in improved render performance.

18 Claims, 7 Drawing Sheets

USING RENDER-GRAPH CHARACTERISTICS TO OPTIMIZE THE RENDERING OF AN ADJUSTED IMAGE

BACKGROUND

This disclosure relates generally to the field of image processing. More particularly, but not by way of limitation, it relates to a technique for optimizing the rendering of an image using render graph characteristics.

An image-processing pipeline takes as input one or more images to be processed and one or more filters representing the processing to be performed and produces as output, a processed image. The process of applying the filters on the input image and producing the output image is called rendering.

One of the ways for an age-processing pipeline to perform rendering is to create a render graph, which is a graph representing the hierarchy of the filters to be applied on the input image to obtain the desired output image. A bottom-up traversal of the render-graph, rendering each node of the graph into an intermediate buffer, which is then used as input to the next render, results in the desired output image being rendered at the end of the last ender.

In many pipelines, the intermediate buffer resulting from the render of a graph node N, could be used as an input buffer by more than one parent graph node. For each such parent node that requests the output buffer from N, a render of N is performed, which in turn results in a render of all the descendant nodes of N in the render-graph.

Since the rendering of each graph node is an expensive operation, rendering the same node multiple times could result in very slow renders.

SUMMARY

A technique for optimizing the rendering of such complex render-graphs caches intermediate buffers of nodes that are expected to be re-used after they've been rendered. The render-graph is examined to determine the number of re-uses of each node's output buffer, and the buffer is cached in memory until all the re-uses of the buffer have occurred. Once all the re-uses of the buffer have occurred, the buffer is removed from the cache. Because no nodes will be re-rendered, rendering performance may be improved.

In one embodiment, a method of rendering an mage is disclosed. The method includes generating a render graph corresponding to the image using a processor; analyzing the render graph, for each node of the render graph, determining a number of uses of an output of the node as input to another node; and executing the render graph by the processor to render the image, generating a rendered image, and outputting the rendered image. Executing a rendered image includes executing a first node of the render graph, generating an intermediate output buffer; caching the intermediate output buffer; reusing the cached intermediate output as an input of a second node of the render graph; and updating an indication of remaining uses of the cached intermediate output.

In another embodiment, a non-transitory program storage device is disclosed. The storage device is readable by a programmable control device, and includes instructions stored thereon for causing the programmable control device to analyze a render graph corresponding to one or more images to determine how many times a first node of the render graph provides input to a second node of the render graph; and render the one or more images, generating a rendered image. The instructions for rendering the one or more images include instructions causing the processor to generate an intermediate output buffer as a result of execution of the first node; cache the intermediate output buffer; and reuse the cached intermediate output buffer as an input of a second node of the render graph.

In yet another embodiment, an apparatus is disclosed. The apparatus includes a programmable control device; and a memory coupled to the programmable control device, wherein instructions are stored in the memory, the instructions causing the programmable control device to analyze a render graph corresponding to one or more images to determine how many times a first node of the render graph provides input to a second node of the render graph; and render the one or more images, generating a rendered image. The instructions for rendering the one or more images includes instructions for causing the processor to generate an intermediate output buffer as a result of execution of the first node; cache the intermediate output buffer; reuse the cached intermediate output buffer as an input of a second node of the render graph; and update an indication of remaining uses of the cached intermediate output.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Image processing techniques typically apply multiple filters to an image to produce an adjusted image. As described above, a commonly used approach for defining an image processing pipeline is to create a render graph, in which output buffers of child nodes are used as input buffers of parent nodes. Because rendering is so expensive, re-performing a filter and recreating its output buffer is undesirable.

Render Graph Basics

Figure 1:
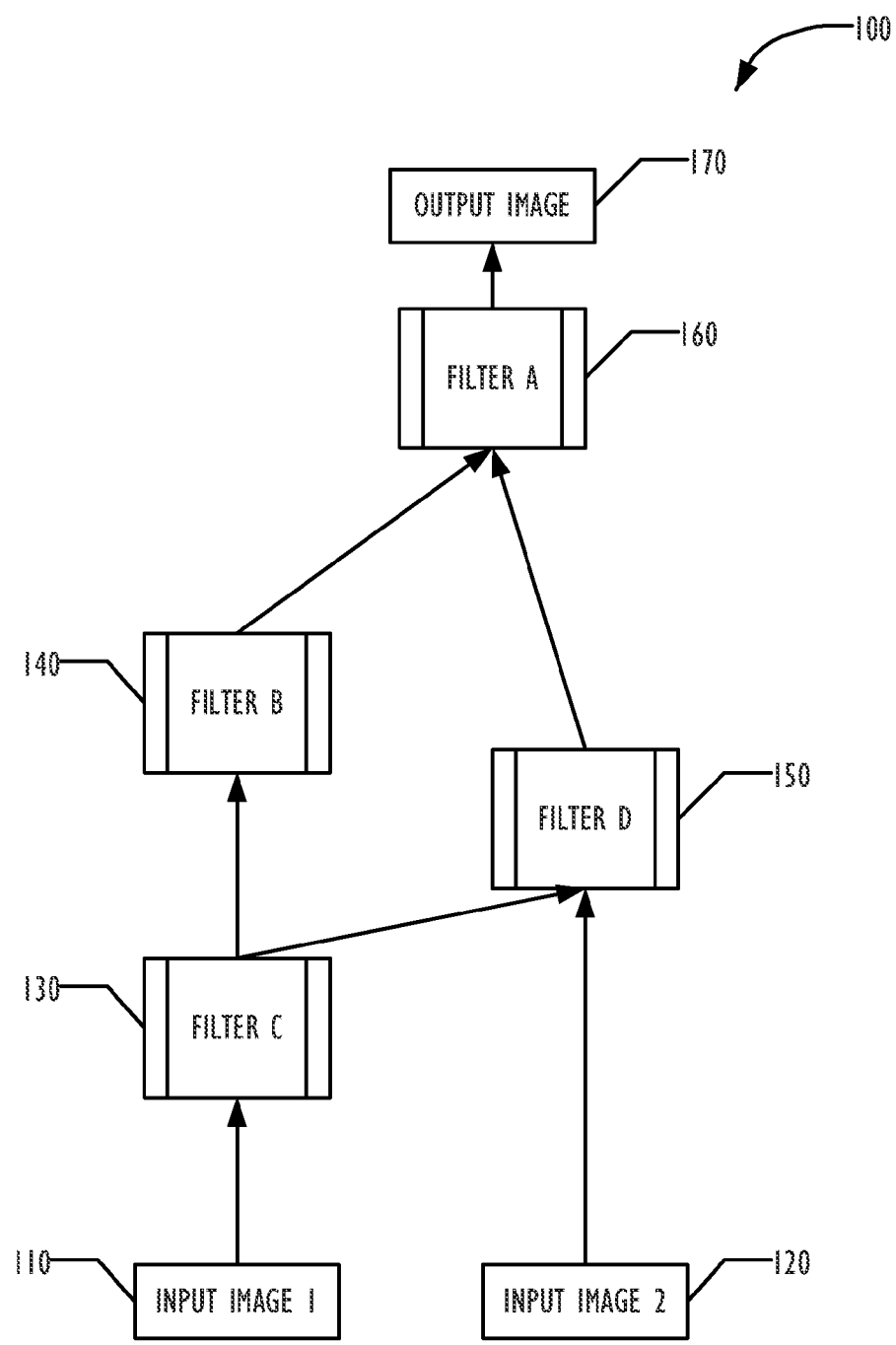
FIG. 1 a graph illustrating a simplified render graph according to one embodiment.

FIG. 1 is a simplified example render graph 100 according to one embodiment that illustrates the desirability of reusing output buffers. In this simple example, input images 110 and 120 are to be processed using filters 130-160, to produce output image 170. In the discussion below, performing a node of the render graph is defined as executing the filter represented by that node, using image data as input to the filter, and producing adjusted image data as output, typically for use as input to another filter. Many types of filters are known, performing various kinds of processing on an image.

In this example render graph, Filter 130 is an input to filter 140 and filter 150. Filters 140 and 150 are input to filter 160. Without optimizing the execution of render graph 100, filter 130 must be performed twice. This graph is illustrative and by way of example only. In actual implementations, render graphs typically are much larger than the simplified render graph 100 of FIG. 1, with potentially thousands of nodes in the render graph. The size of render graphs and the complexity of the image processing operations performed at each node of the graph causes image processing to require significant computational resources in order to produce the resulting image in a usable time.

Existing techniques for optimizing the rendering of complex graphs typically rely on least recently used (LRU) caching schemes. In age-based caching schemes, all a filter's output buffer enter the cache with equal cache priorities when they are first rendered, and at every render pass, the priorities of all the buffers in the cache are decremented. After the decrement, the buffers whose priorities hit a threshold low value (typically zero) are removed from the cache and purged. However, if a buffer that is present in the cache is reused, its priority is increased and it remains in the cache. Summarily, LRU caching schemes assume that a buffer that has been reused recently is likely to be reused again in the future and these schemes rely entirely on dynamic buffer re-use behavior. A buffer that is reused at least once may remain in the cache, even after the last use. A buffer may be purged from the cache before its reuse is seen while traversing the render graph, thus forcing a filter to be rerun and the output buffer recreated. Thus, in the example of FIG. 1, the output buffer of filter 130 would likely be preserved in the cache even after execution of filters 140 and 150, even though it is never used again.

As described below, by traversing the render graph prior to rendering the image, information about reuse may be predetermined and used during the rendering. This pre-gathered information allows eliminating too-early cache flushes, as well as too-late cache retention, as is described below in more detail.

Overview of Performing a Render Graph

Figure 2:
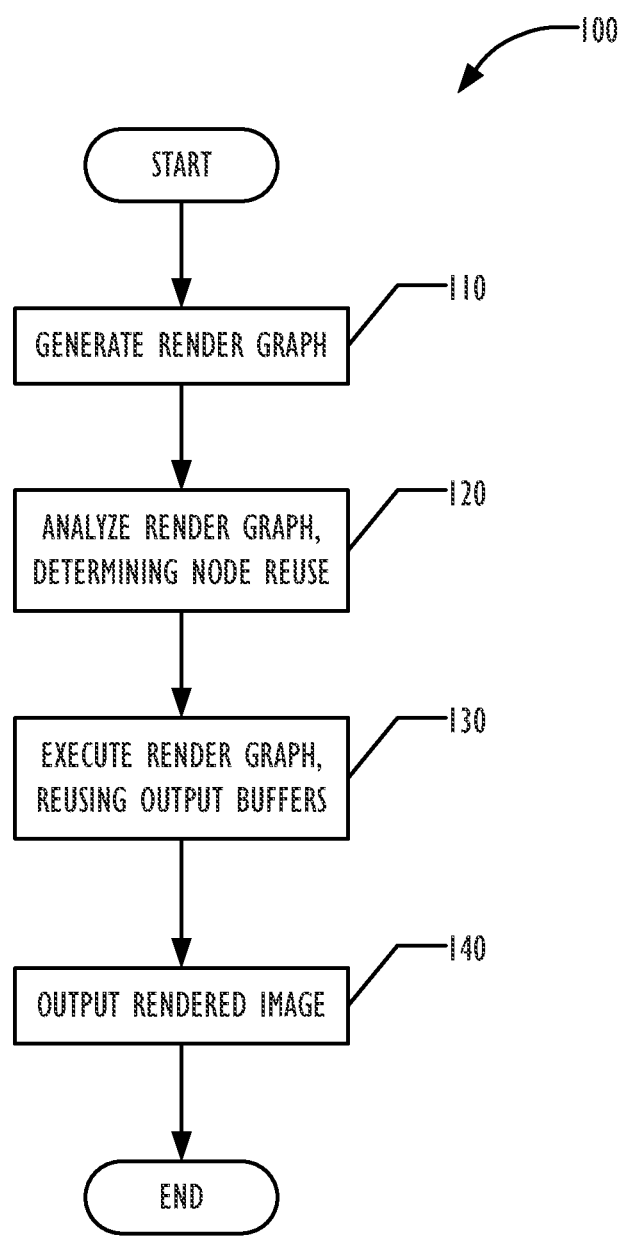
FIG. 2 is a flowchart illustrating a technique for optimizing the rendering of an adjusted image according to one embodiment.

FIG. 2 is a flowchart illustrating a technique for rendering a graph according to one embodiment. In block 110, a render graph is created, using any desired technique for creating a render graph. The creation of render graphs is well known in the art, and need not be described further herein. Any desired technique for creating a render graph may be employed. Render graphs are typically maintained in memory, but may be stored in any desired way on any storage media.

In block 120, a pre-rendering phase analyzes the render graph, determining which nodes in the render graph are used as input to more than one other node. Although typically performed as a top-down traversal of the render graph, any desired technique for traversing a graph and analyzing the connections between nodes may be used. Graph traversal techniques are also well known and need not be described in detail herein. As each node in the graph is examined, a count is obtained indicating how many times that the output of that node is used as input to other nodes in the graph. That count may be considered a priority value for the node. In one embodiment, a node whose output is used as input by 2 other nodes would be assigned a priority of 2, a node whose output is used as input by 3 other nodes would be assigned a priority of 3, etc.

After the traversal of the render graph in block 120, the render graph may then be executed or performed in block 130. As each node is performed, rendering the image with the associated filter, the output buffer may be discarded or cached, depending on the priority of that node. The output buffer of a node with a priority indicating that additional uses remain may be cached, while the output buffer of a node with a priority indicating that no additional uses remain may be discarded. As each use of the output buffer occurs, its priority value may be decremented. If a node is to be performed that has a cached output buffer, the cached output buffer may be provided as input to a parent node without re-performing the node.

In one embodiment, each node's cached output buffer may be stored in a linked list associated with the priority value. Other techniques for associating nodes with priority values may be employed as desired. The technique guarantees that an output buffer for a node may be discarded as quickly as possible, with the least likelihood that the output buffer will be discarded too early, unlike the conventional LRU techniques outlined above.

In block 140, the resulting rendered image may be output. The rendered image may be stored in a storage medium, displayed for a user, etc., as desired.

Determining Use Counts for Render Graph Nodes

Figure 3:
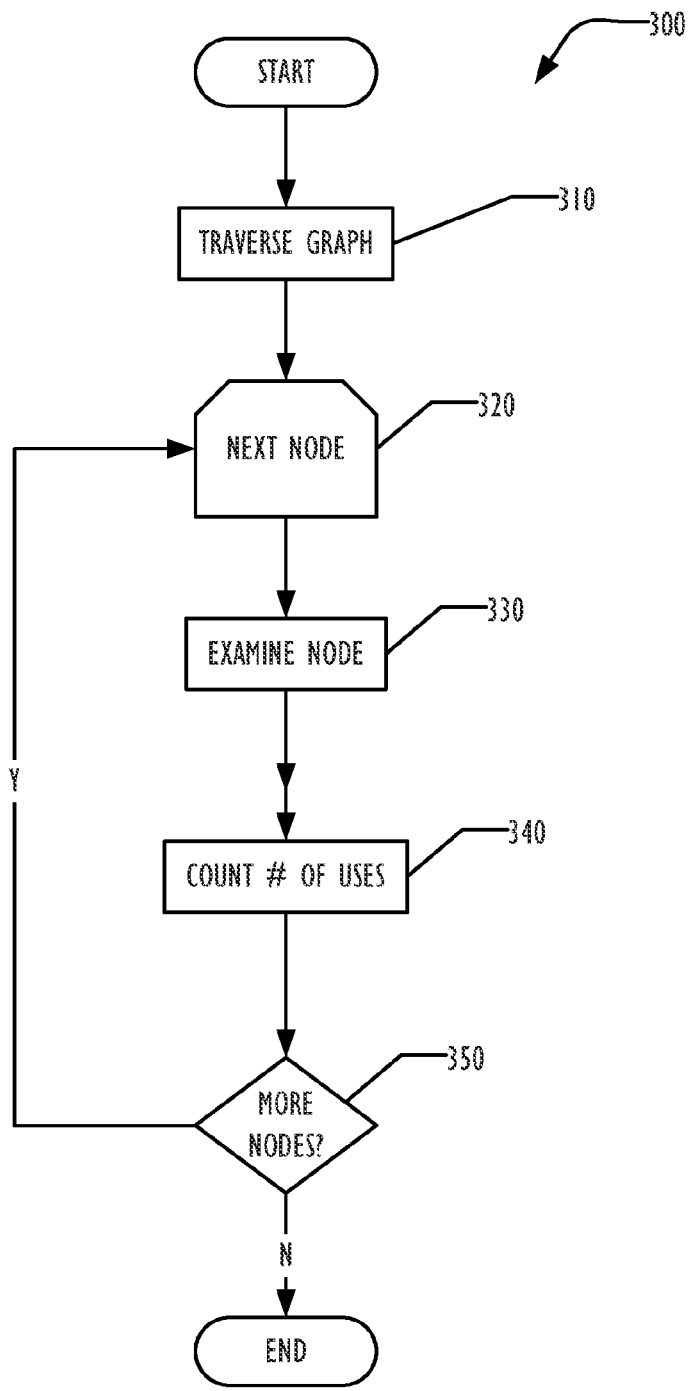
FIG. 3 is a flowchart illustrating a pre-rendering phase according to one embodiment.

FIG. 3 is a flowchart illustrating a technique 300 for traversing the render graph and determining the priority or use count of each node. In block 310, a traversal of the graph is begun, typically as a top down traversal. In block 320, the next node is determined, and then examined in block 330. In block 340, the number of uses of the output of that node is determined and stored as a priority value associated with the node. In block 350, if there are any more nodes in the graph, processing is repeated beginning at block 320. After the last node is traversed, each node is associated with a priority value that indicates how often that node is to be used as input to another node. Any desired technique may be used for traversing the render graph. Because graph traversal techniques are ell known, no further description of the traversal technique is provided herein.

Performing a Node in a Render Graph

Figure 4:
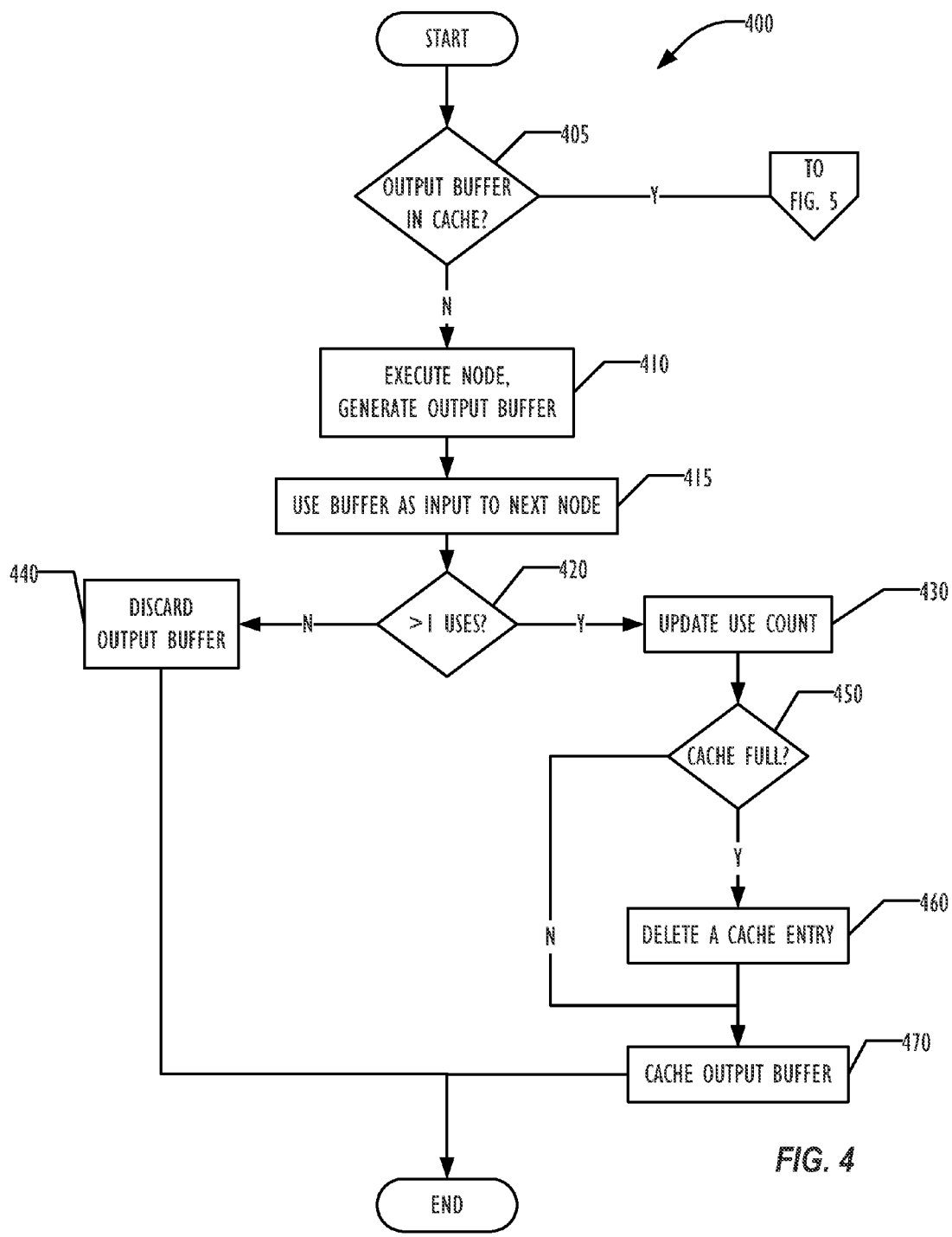
FIG. 4 is a flowchart illustrating a first rendering phase according to one embodiment.

FIG. 4 is a flowchart illustrating a technique 400 for performing a node of render graph according to one embodiment. Any desired technique for selecting the next node of a render graph to perform may be used. Because such techniques are well known, no further description of the node selection technique is provided herein.

In block 405, before performing a node of the render graph, a check is made to determine whether an output buffer for that node has already been cached. If so, then the technique continues on FIG. 5, where the cached output buffer may be used. In block 410, the node of the render graph is performed or executed for the first time. Execution of a node may vary depending on the nature of the filter being performed. The output of the node is passed as input to the next (parent) node in the render graph in block 415.

In block 420, the pre-calculated count of uses of this node is checked. If this node is to be used only once, then in block 440 the output buffer may be discarded. If this node is to be used more than once, then in block 430, the number of remaining uses is updated. In one embodiment, a use count is simply decremented from an original count value. In other embodiments, an actual use count may be incremented for later comparison with the pre-calculated maximum number of uses. Other techniques keeping track of the number of uses of the output buffer may be used as desired.

In block 450, if the output buffer cache is not full, then in block 470 the new output buffer may be added to the cache. If the buffer cache is full, then in block 460 an output buffer may be discarded from the cache. Unlike the conventional LRU technique, buffers may be flushed from the cache based on their remaining uses, ensuring that the cached output buffer with the least remaining uses is cached, even if it was the most output buffer most recently added to the cache. For example, if the cache is found full in block 450, a cache entry with only 1 remaining use may be discarded, leaving other cache entries with more than 1 remaining use. If more than one cache entry has the least number of remaining uses, any desired technique for selecting which such cache entry to discard may be used. In one embodiment, all entries with the least number of remaining uses may be discarded. In another embodiment, the oldest or least recently used cache entry with the least remaining uses may be discarded. Although described as a cache, any technique for storing output buffers for later use that allows discarding stored buffers as described above may be used.

Reusing an Output Buffer

Figure 5:
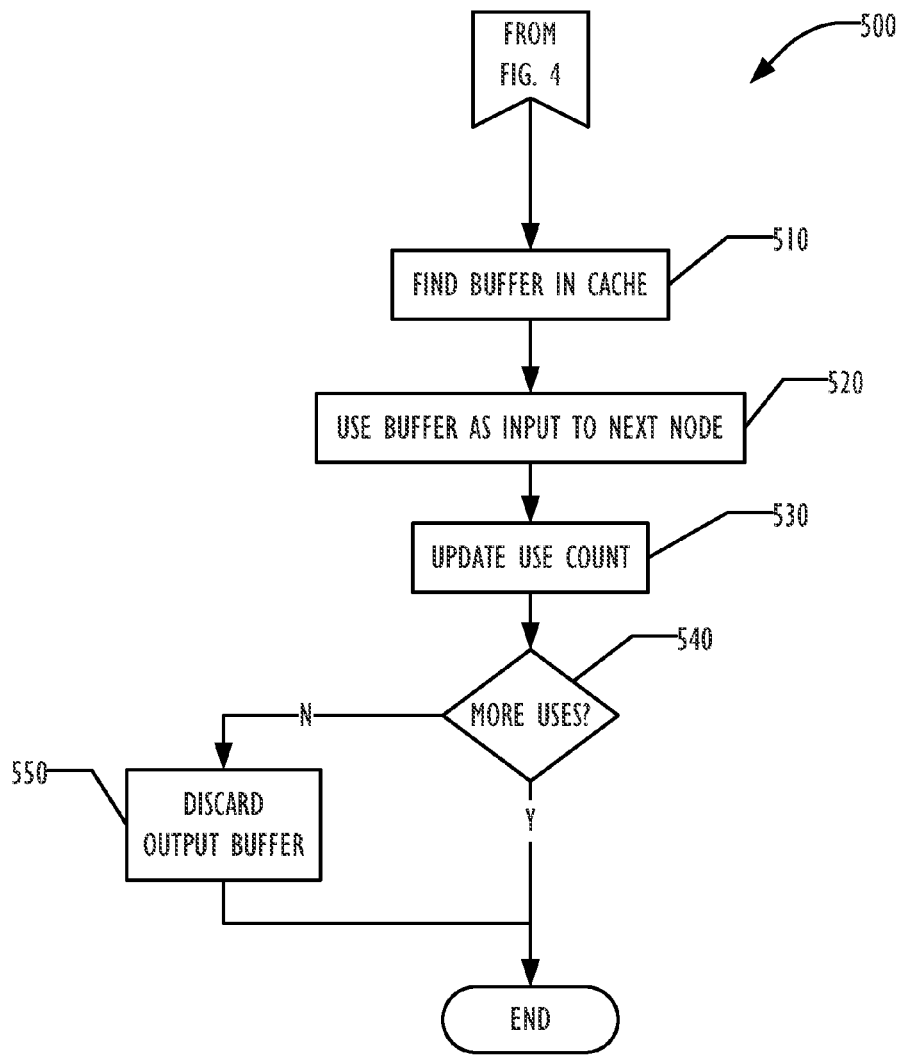
FIG. 5 is a flowchart illustrating reuse of an output buffer during rendering according to one embodiment.

Turning to FIG. 5, a flowchart illustrates a technique 500 for reusing a cached output buffer according to one embodiment. In block 510, the cached output buffer is obtained, and used in block 520 as input to the next or parent node in the render graph. In block 530, the use count for that output buffer may be updated. If there are no more uses, as determined in block 540, then in block 550 the output buffer may be discarded. Otherwise, the output buffer is left in the cache for the next use. As explained above, any desired technique may be used for updating the remaining number of uses of the output buffer, including decrementing a counter.

Implementation in an Electronic Device

Figure 6:
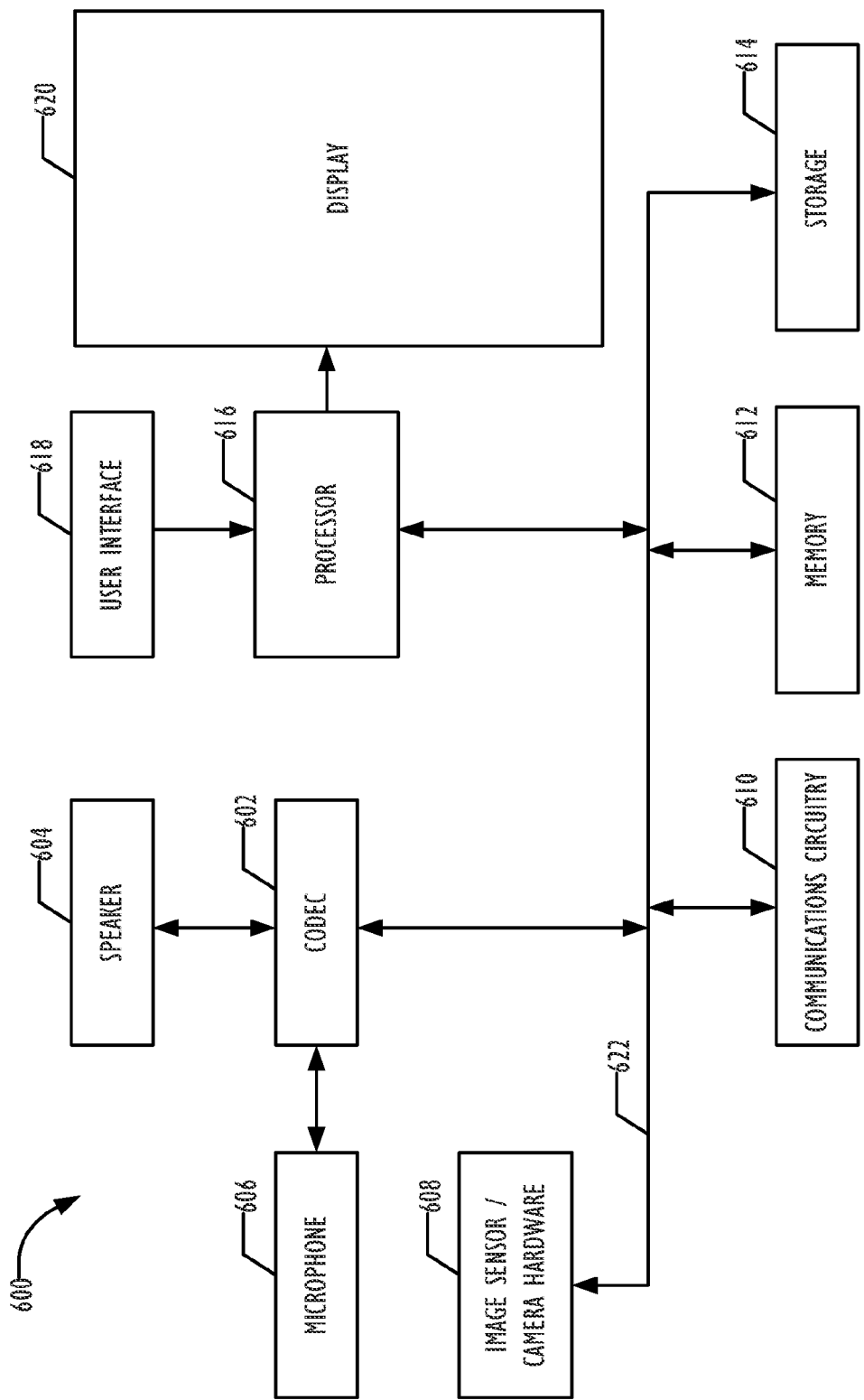
FIG. 6 is a block diagram illustrating of an electronic device for performing the technique of FIGS. 1-5 according to one embodiment.

FIG. 6 is a simplified functional block diagram illustrating an electronic device 600 according to one embodiment that can implement the techniques described above. The electronic device 600 may include a processor 616, display 620, microphone 606, audio/video codecs 602, speaker 604, communications circuitry 610, an image sensor with associated camera hardware 608 for performing image capture, user interface 618, memory 612, storage device 614, and communications bus 622. Processor 616 may be any suitable programmable control device and may control the operation of many functions, such as the generation and/or processing of image data, as well as other functions performed by electronic device 600. Processor 616 may drive display 620 and may receive user inputs from the user interface 618. An embedded processor provides a versatile and robust programmable control device that may be utilized for carrying out the disclosed techniques.

Storage device 614 may store media (e.g., image and video files), software (e.g., for implementing various functions on device 600), preference information, device profile information, and any other suitable data. Storage device 614 may include one more storage mediums for tangibly recording image data and program instructions, including for example, a hard-drive, permanent memory such as ROM, semi-permanent memory such as RAM, or cache. Program instructions may comprise a software implementation encoded in any desired language (e.g., C or C++).

Memory 612 may include one or more different types of memory which may be used for performing device functions. For example, memory 612 may include cache, ROM, and/or RAM. Communications bus 622 may provide a data transfer path for transferring data to, from, or between at least storage device 614, memory 612, and processor 616. Although referred to as a bus, communications bus 622 is not limited to any specific data transfer technology. User interface 618 may allow a user to interact with the electronic device 600. For example, the user interface 618 can take a variety of forms, such as a button, keypad, dial, a click wheel, or a touch screen.

In one embodiment, the electronic device 600 may be an electronic device capable of processing and displaying media, such as image and video files. For example, the electronic device 600 may be a device such as such a mobile phone, personal data assistant (PDA), portable music player, monitor, television, laptop, desktop, and tablet computer, or other suitable personal device.

Optimizing a Render Graph

The output buffer reuse techniques described above may allow optimizations of a render graph that would not be efficient without such a buffer reuse technique. For example an electronic device may provide the ability to blur an image at several predetermined radii. Blurring is a known expensive filter in terms of processing resources necessary to perform the action, and the cost generally increases exponentially with an increase in radius of blurring. Different blur filters may be provided at several preselected radii. Without output buffer reuse, a render graph that allows for blurring at a radius of 5, 15, and 50 may include nodes that execute a blur filter at each of those radii. With output buffer reuse, the render graph may be made more efficient by using additive principles.

Figure 7:
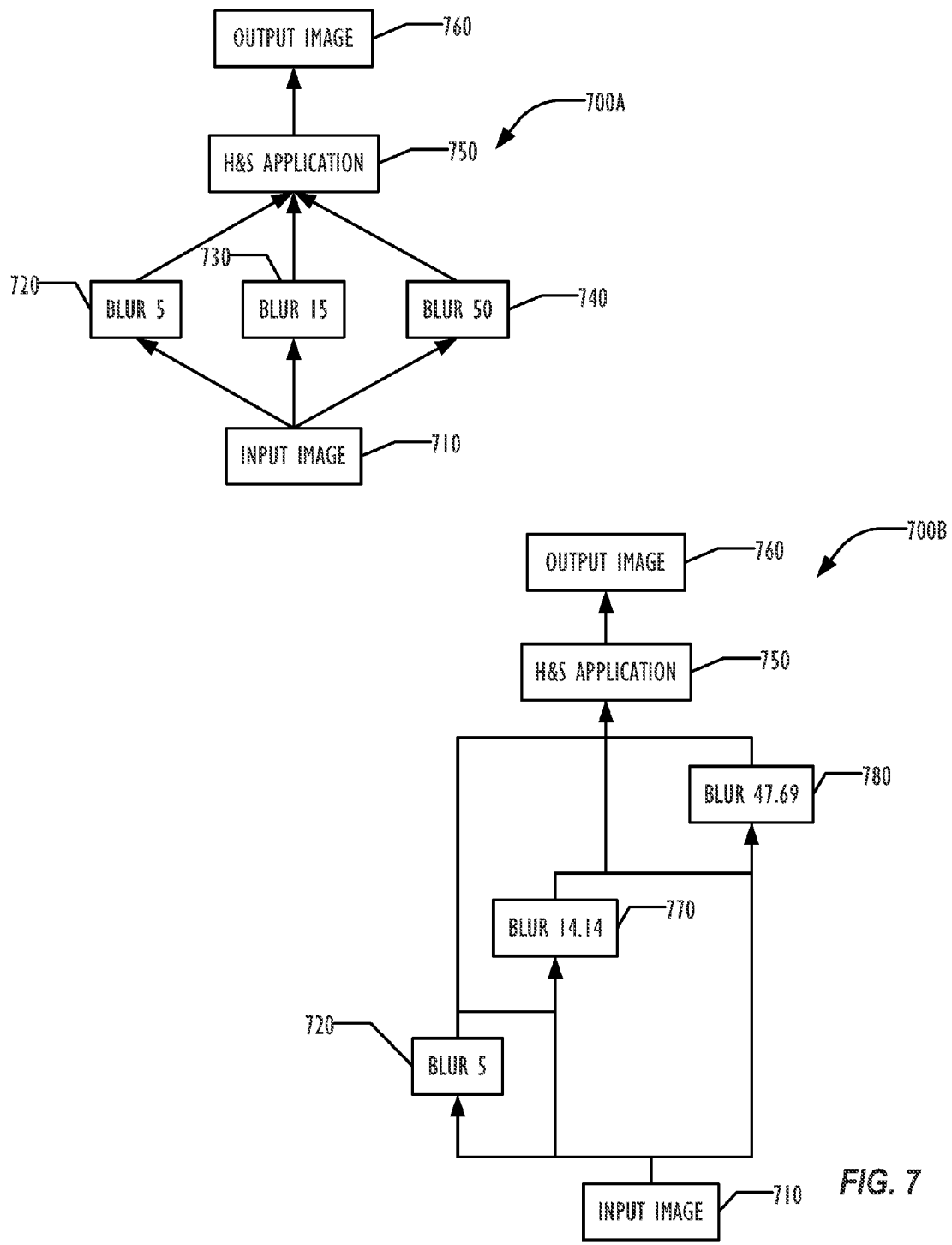
FIG. 7 illustrates a reduction of computational cost as a result of reusing an output buffer during rendering, according to one embodiment.

As illustrated in FIG. 7, a render graph 700A includes an input image 710 that is processed by a blur filter with a radius of 5 (720), a blur filter with a radius of 15 (730) and a blur filter with a radius of 50 (740). The output of each blur filter is provided as input to a highlights and shadow application (750), producing an output image 760. An optimized render graph 700B may make use of the output buffer reuse techniques described above to provide for the same image processing at less computational cost. The output of the blur filter with a radius of 5 (720) may now be provided to the highlights and shadow application 750 directly, as well as to a blur filter with a radius of 14.14 (770). By reusing the output buffer of the blur filter with a radius of 5 (720) as input to the blur filter with a radius of 14.14 (770), the same result may be produced as input to the highlights and shadow filter (750) as the output of the blur filter with a radius of 15 (730) of render graph 700A, but with a reduced computational cost. Similarly, by reusing the output of the blur filter with a radius of 14.14 (770), that output buffer may be provided as input to a blur filter with a radius of 47.69 (780), to produce the same result as the output of the blur filter with a radius of 50 (740) of render graph 700A, but with reduced computational cost.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A method of rendering an image, comprising:
generating, using a processor, a render graph corresponding to an image, the render graph comprising a first node in a plurality of nodes;
analyzing the render graph, using the processor, to identify a total number of nodes in the plurality of nodes that use an output of the first node;
assigning, using the processor, the identified total number of nodes as the first node's use indicator; and
executing, using the processor, the render graph to render the image by:
executing the first node of the render graph to generate contents for an intermediate output buffer when the first node's use indicator is greater than one;
caching the intermediate output buffer's contents to a cache;
using the cached intermediate output buffer's contents as an input for a second node in the plurality of nodes;
updating, in response to using the cached intermediate output buffer, the first node's use indicator to reflect a remaining number of nodes in the plurality of nodes that use the output of the first node; and
discarding, from the cache, the intermediate output buffer's contents when the first node's use indicator equals zero.

2. The method of claim 1, wherein analyzing the render graph comprises:
traversing the render graph top down.

3. The method of claim 1, wherein analyzing the render graph comprises:
generating a count of uses of an output of each node in the plurality of nodes; and
storing the count of uses of each node's output as an indication of remaining uses of each node's output.

4. The method of claim 1, wherein updating the first node's use indicator comprises decrementing the use indicator.

5. The method of claim 1, further comprising reusing the intermediate output buffer's contents from the cache as an input of a second node in the render graph instead of re-executing the first node.

6. The method of claim 1, wherein caching the intermediate output buffer's contents comprises:
determining the cache is full;
identifying a lowest priority intermediate output buffer in the cache, the lowest priority intermediate output buffer having the lowest use indicator; and
discarding, based on the identifying, the lowest priority intermediate output buffer's contents from the cache.

7. The method of claim 1, further comprising discarding the intermediate output buffer's contents if there are no remaining uses of the intermediate output buffer's contents.

8. A non-transitory program storage device, readable by a programmable control device, comprising instructions stored thereon for causing the programmable control device to:
analyze a render graph corresponding to one or more images to identify a total number of nodes in a plurality of nodes from the render graph that use an output of a first node of the render graph;
assign the identified total number of nodes as the first node's use indicator; and
render the one or more images by causing the processor to:
execute the first node to generate contents for an intermediate output buffer when the first node's use indicator is greater than one;
cache the intermediate output buffer's contents to a cache;
use the cached intermediate output buffer's contents as an input of a second node in the plurality of nodes;
update, in response to the using, the first node's use indicator to reflect a remaining number of nodes in the plurality of nodes that use the output of the first node; and
discard the intermediate output buffer's contents from the cache when the first buffer's use indicator equals zero.

9. The non-transitory computer readable storage device of claim 8, wherein the instructions stored thereon further comprise instructions to cause the programmable control device to:
generate the render graph.

10. The non-transitory computer readable storage device of claim 8, wherein the instructions stored thereon further comprise instructions to cause the programmable control device to:
output the rendered image.

11. An apparatus, comprising:
a programmable control device; and
a memory coupled to the programmable control device, wherein instructions are stored in the memory, the instructions comprising instructions causing the programmable control device to:
analyze a render graph corresponding to one or more images to identify a total number of nodes in a plurality of nodes that use an output of a first node;
assign the identified total number of nodes as the first node's use indicator; and
render the one or more images by causing the processor to:
execute the first node to generate contents for an intermediate output buffer when the first node's use indicator is greater than one;
cache the intermediate output buffer's contents to a cache;
use the cached intermediate output buffer's contents as an input for a second node in the plurality of nodes;
update, in response to using the cached intermediate output buffer, the first node's use indicator to reflect a remaining number of nodes in the plurality of nodes that use the output of the first node; and
discard from the cache the intermediate output buffer's contents when the first node's use indicator equals zero.

12. The apparatus of claim 11, further comprising:
a display, wherein the instructions stored in the memory further comprise instructions causing the programmable control device to output the rendered image on the display.

13. The apparatus of claim 11, wherein the instructions stored in the memory further comprise instructions causing the programmable control device to:
generate the render graph.

14. The apparatus of claim 11, wherein the instructions causing the programmable control device to analyze the render graph comprise instructions causing the programmable control device to traverse the render graph top down.

15. The apparatus of claim 11, wherein the instructions causing the programmable control device to analyze the render graph comprise instructions causing the programmable control device to:
store a count of uses of each node's output as an indication of remaining uses of each node's output.

16. The apparatus of claim 11, wherein the instructions causing the programmable control device to update the first node's use indicator comprise instructions causing the programmable control device to decrement the first node's use indicator.

17. The non-transitory computer readable storage device of claim 8, wherein the instructions stored thereon to cause the programmable control device to cache the intermediate output buffer to a cache comprises instructions to cause the programmable control device to:
- determine the cache is full;
- identify a lowest priority intermediate output buffer in the cache, the lowest priority intermediate output buffer having the lowest use indicator in the cache; and
- discard, based on the identifying, the lowest priority intermediate output buffer's contents from the cache.

18. The apparatus of claim 11, wherein the instructions causing the programmable control device to cache the intermediate output buffer to a cache comprises instructions to cause the programmable control device to:
- determine the cache is full;
- identify a lowest priority intermediate output buffer in the cache, the lowest priority intermediate output buffer having the lowest use indicator in the cache; and
- discard, based on the identifying, the lowest priority intermediate output buffer's contents from the cache.

* * * * *